US012087479B2

(12) United States Patent
Pineda et al.

(10) Patent No.: US 12,087,479 B2
(45) Date of Patent: Sep. 10, 2024

(54) METAL OXIDE VARISTOR WITH REINFORCED ELECTRODES

(71) Applicant: Littelfuse, Inc., Chicago, IL (US)

(72) Inventors: Martin G. Pineda, Fremont, CA (US); Sergio Fuentes Godinez, Newark, CA (US); Minh V. Ngo, San Jose, CA (US); Yuriy Borisovich Matus, Pleasanton, CA (US)

(73) Assignee: Littelfuse, Inc., Chicago, IL (US)

( * ) Notice: Subject to any disclaimer, the term of this patent is extended or adjusted under 35 U.S.C. 154(b) by 0 days.

(21) Appl. No.: 17/861,704

(22) Filed: Jul. 11, 2022

(65) Prior Publication Data

US 2022/0344078 A1 Oct. 27, 2022

Related U.S. Application Data

(60) Provisional application No. 63/286,853, filed on Dec. 7, 2021.

(51) Int. Cl.
*H01C 7/12* (2006.01)
*H01C 1/14* (2006.01)
*H01C 7/108* (2006.01)

(52) U.S. Cl.
CPC ............... *H01C 7/126* (2013.01); *H01C 1/14* (2013.01); *H01C 7/108* (2013.01)

(58) Field of Classification Search
CPC ........... H01C 7/126; H01C 1/14; H01C 7/108
See application file for complete search history.

(56) References Cited

U.S. PATENT DOCUMENTS

| | | | | |
|---|---|---|---|---|
| 2,848,593 A * | 8/1958 | Newman | B23K 9/186 | 219/146.1 |
| 4,069,465 A * | 1/1978 | Kouchich | H01C 7/102 | 29/613 |
| 7,453,681 B2 * | 11/2008 | Ho | H01C 7/108 | 338/21 |
| 7,598,840 B2 * | 10/2009 | Lu | H01C 7/126 | 338/21 |
| 8,780,521 B2 * | 7/2014 | Xu | H01H 37/761 | 361/126 |
| 11,107,612 B2 * | 8/2021 | Matus | H01C 7/12 | |
| 2015/0270086 A1 * | 9/2015 | Chen | H01C 7/126 | 337/187 |
| 2017/0012425 A1 * | 1/2017 | Pons Gonzalez | H02H 3/17 | |

FOREIGN PATENT DOCUMENTS

| | | | | |
|---|---|---|---|---|
| CN | 203812666 | * | 9/2014 | |
| DE | 3606430 | * | 9/1987 | |
| JP | H06226413 | * | 8/1994 | |
| WO | WO-2015118204 | * | 8/2015 | G01R 19/16576 |

OTHER PUBLICATIONS

DE-3606430, machine translation (Year: 1987).*
CN-203812666, machine translation (Year: 2014).*
WO-2015118204, machine translation (Year: 2015).*
JP-H06226413, machine translation (Year: 1994).*

* cited by examiner

*Primary Examiner* — Kyung S Lee
(74) *Attorney, Agent, or Firm* — KDW FIRM PLLC

(57) ABSTRACT

A metal oxide varistor (MOV) device including a MOV chip, electrically conductive first and second electrodes disposed on opposite sides of the MOV chip, and electrically conductive first and second leads connected to the first and second electrodes, respectively, wherein the first and second electrodes are formed of a material having a melting point greater than 1100 degrees Celsius.

15 Claims, 2 Drawing Sheets

METAL OXIDE VARISTOR WITH REINFORCED ELECTRODES

BACKGROUND

Field

The present disclosure relates generally to the field of circuit protection devices. More specifically, the present disclosure relates to a metal oxide varistor that is resistant to combustion when subjected to excessive heating.

Description of Related Art

Metal oxide varistors (MOVs) are voltage dependent, nonlinear devices that provide transient voltage suppression in electronic circuits. A MOV has high electrical resistance when subjected to a low voltage and a low electrical resistance when subjected to a high voltage. When connected in parallel with a protected circuit component, a MOV can clamp voltage to a safe level in the event of a high transient voltage in the circuit. The MOV thus absorbs energy that could otherwise damage the protected component.

A shortcoming associated with traditional MOVs is that they are prone to electrical punch through when subjected to high local current, which can lead to excessive heating and subsequent combustion. For example, in the event of an abnormal overvoltage condition, a MOV may overheat and may experience thermal runaway and/or electrical puncture, whereby hot plumes of gas can rupture electrodes on the exterior surfaces of the MOV and melt or ignite the polymer outer coating of the MOV.

It is with respect to these and other considerations that the present improvements may be useful.

SUMMARY

This Summary is provided to introduce a selection of concepts in a simplified form further described below in the Detailed Description. This Summary is not intended to identify key features or essential features of the claimed subject matter, nor is the summary intended as an aid in determining the scope of the claimed subject matter.

A metal oxide varistor (MOV) device in accordance with an exemplary embodiment of the present disclosure may include a MOV chip, electrically conductive first and second electrodes disposed on opposite sides of the MOV chip, and electrically conductive first and second leads connected to the first and second electrodes, respectively, wherein the first and second electrodes are formed of a material having a melting point greater than 1100 degrees Celsius.

A thermally protected metal oxide varistor (TMOV) device in accordance with an exemplary embodiment of the present disclosure may include a MOV chip, electrically conductive first and second electrodes disposed on opposite sides of the MOV chip, an electrically conductive first lead connected to the first electrode, an electrically conductive second lead connected to a dielectric barrier disposed on the second electrode, and a thermal cutoff (TCO) element having a first end electrically connected to the second lead on the dielectric barrier and a second end electrically connected to the second electrode, wherein the first and second electrodes are formed of a material having a melting point greater than 1100 degrees Celsius.

DETAILED DESCRIPTION

Exemplary embodiments of metal oxide varistors (MOVs) having reinforced electrodes in accordance with the present disclosure will now be described more fully hereinafter with reference to the accompanying drawings. The MOVs may, however, be embodied in many different forms and should not be construed as being limited to the embodiments set forth herein. Rather, these embodiments are provided so that this disclosure will convey certain exemplary aspects of the MOVs to those skilled in the art.

Figure 1C:
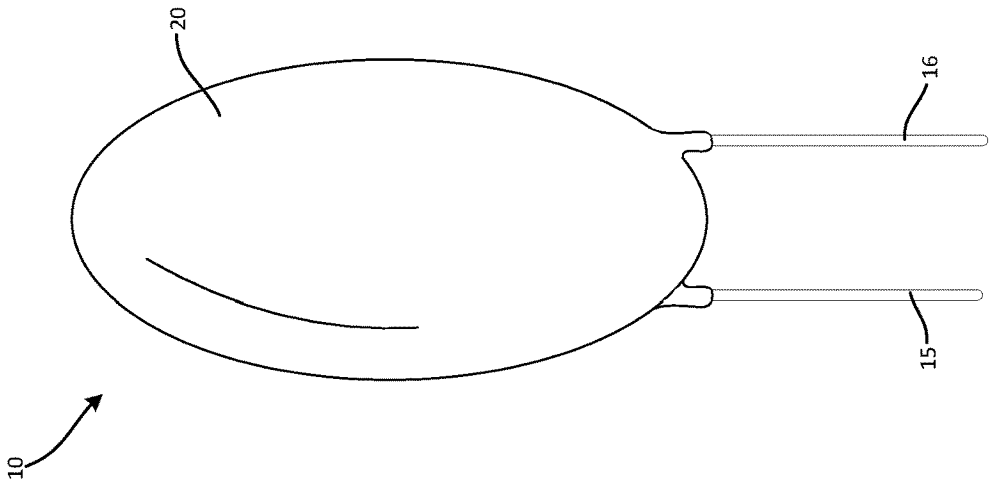
FIG. 1C is a rear perspective view illustrating the MOV device of FIG. 1A with a polymer coating.
Figure 1B:
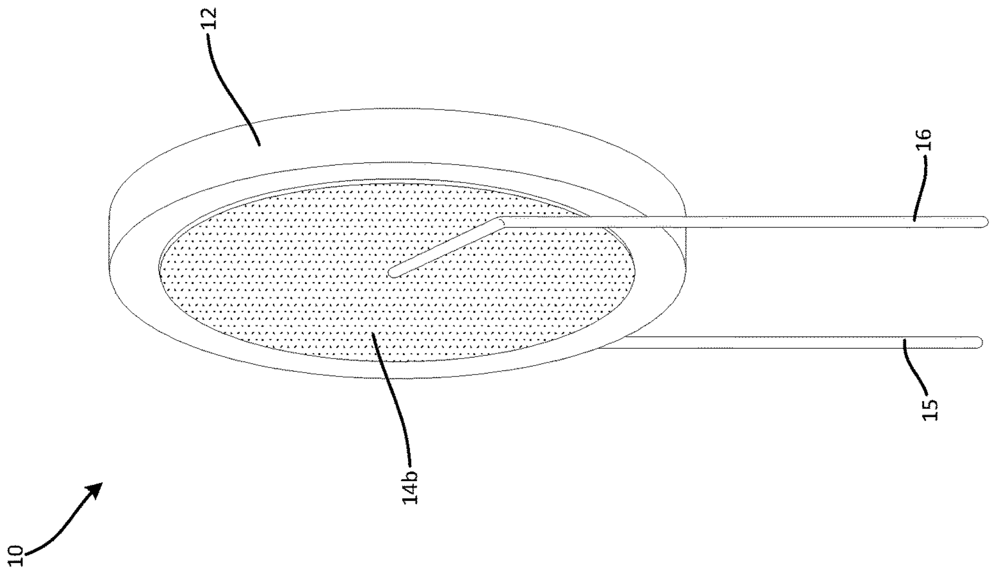
FIG. 1B is a rear perspective view illustrating the MOV device of FIG. 1A.
Figure 1A:
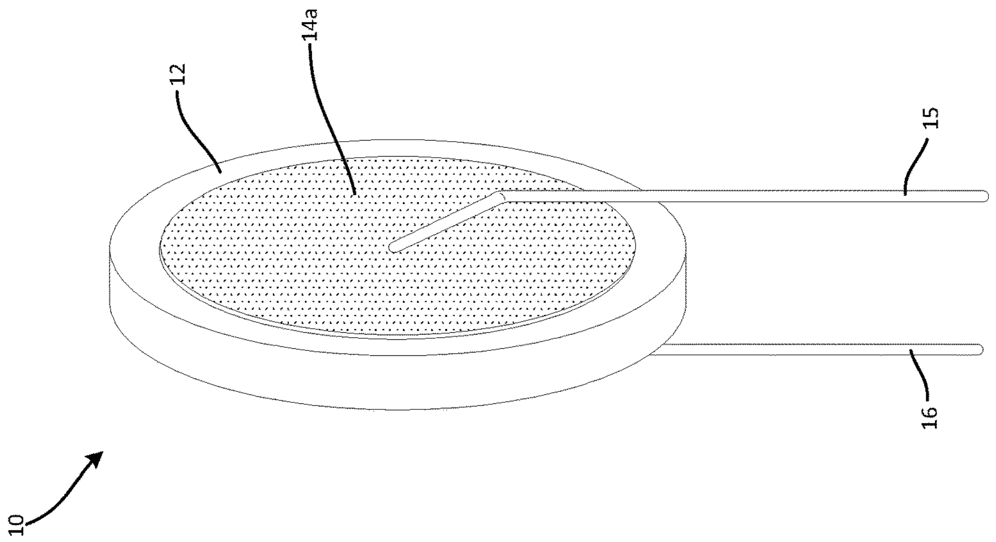
FIG. 1A is a front perspective view illustrating a MOV device in accordance with an exemplary embodiment of the present disclosure.

Referring to FIGS. 1A and 1B, front and rear views of an exemplary embodiment of a MOV device 10 in accordance with the present disclosure are shown. The MOV device 10 may include a MOV chip 12 having first and second electrically conductive electrodes 14*a*, 14*b* disposed on opposite sides thereof. The MOV chip 12 may be formed of any MOV composition known in the art, such as multi crystalline zinc oxide ceramic. The present disclosure is not limited in this regard.

The MOV chip 12 and the electrodes 14*a*, 14*b* are depicted as being circular in shape, but this is not critical. It is contemplated that one or more of the MOV chip 12 and the electrodes 14*a*, 14*b* may have a different shape, such as rectangular, triangular, irregular, etc. without departing from the scope of the present disclosure.

The MOV device 10 may further include electrically conductive first and second leads 15, 16 connected to the first and second electrodes 14*a*, 14*b*, respectively, for facilitating electrical connection of the MOV device 10 within a circuit. In various non-limiting embodiments, the first and second leads 15, 16 may be electrically connected to the first and second electrodes 14*a*, 14*b* via soldering, welding, electrically conductive adhesive, etc.

Referring to FIG. 1C, the MOV device 10 may further include a dielectric polymer coating 20 that covers the MOV chip 12, the first and second electrodes 14*a*, 14*b*, and portions of the first and second leads 15, 16. The polymer coating 20 may protect the components of the MOV device 10 from environmental elements and may prevent electrical shorting between the MOV device 10 and surrounding circuit components.

The first and second electrodes 14*a*, 14*b* of the MOV device 10 may be formed of an electrically conductive material that is more thermally resistant (e.g., has a higher melting point) than metals such as aluminum, copper, or silver that are traditionally used to form the electrodes of MOV devices. For example, the first and second electrodes 14*a*, 14*b* may be formed of various ferrous-based materials, including, but not limited to, galvanized steel, tin-coated steel, or composite materials such as cermet (a composite of metal and ceramic). In various non-limiting embodiments, the first and second electrodes 14*a*, 14*b* may be formed of a material having a melting point greater than 1100 degrees Celsius. In various embodiments, the first and second electrodes 14*a*, 14*b* may have a thickness in a range of 0.2 to 0.6 millimeters. The present disclosure is not limited in this regard.

Owing to the enhanced durability and thermal resistance of the electrodes 14*a*, 14*b* relative to conventional MOV electrodes, the first and second electrodes 14*a*, 14*b* of the MOV device 10 may be highly resistant to rupturing that could otherwise result from thermal runaway and/or electrical puncture in the MOV chip 12 upon overheating. The risk of the polymer coating 20 of the MOV device 10 being ignited during an overheating event as thereby greatly mitigated relative to MOV devices having conventional electrodes.

Figure 2C:
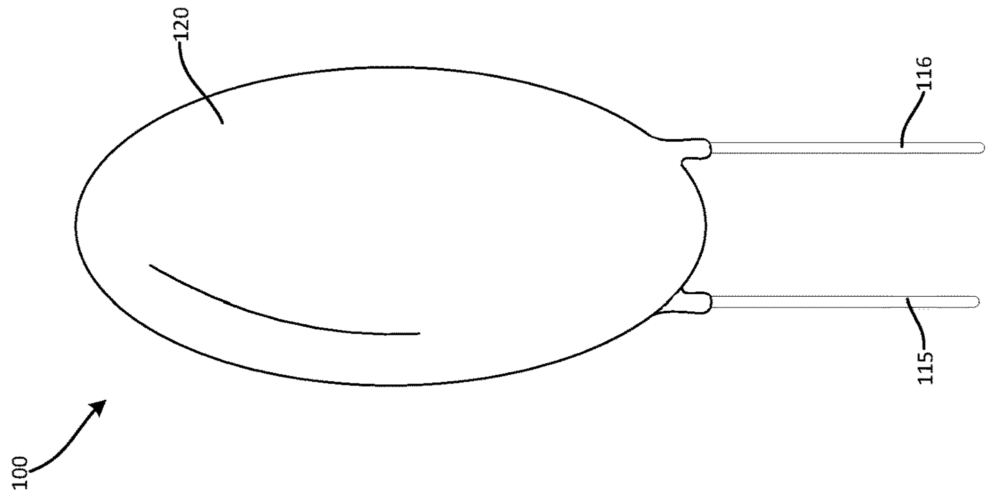
FIG. 2C is a rear perspective view illustrating the TMOV device of FIG. 2A with a polymer coating.
Figure 2B:
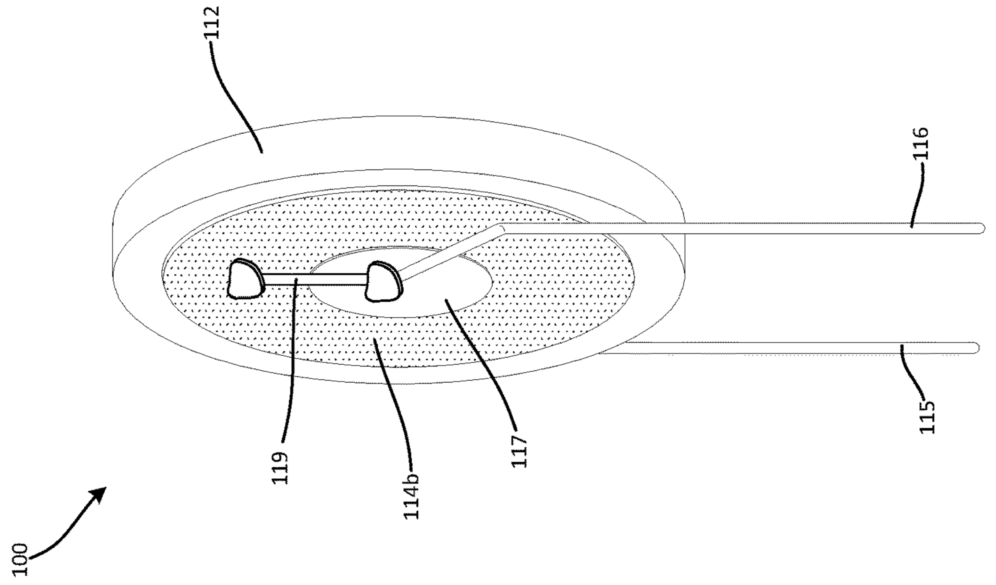
FIG. 2B is a rear perspective view illustrating the TMOV device of FIG. 2A.
Figure 2A:
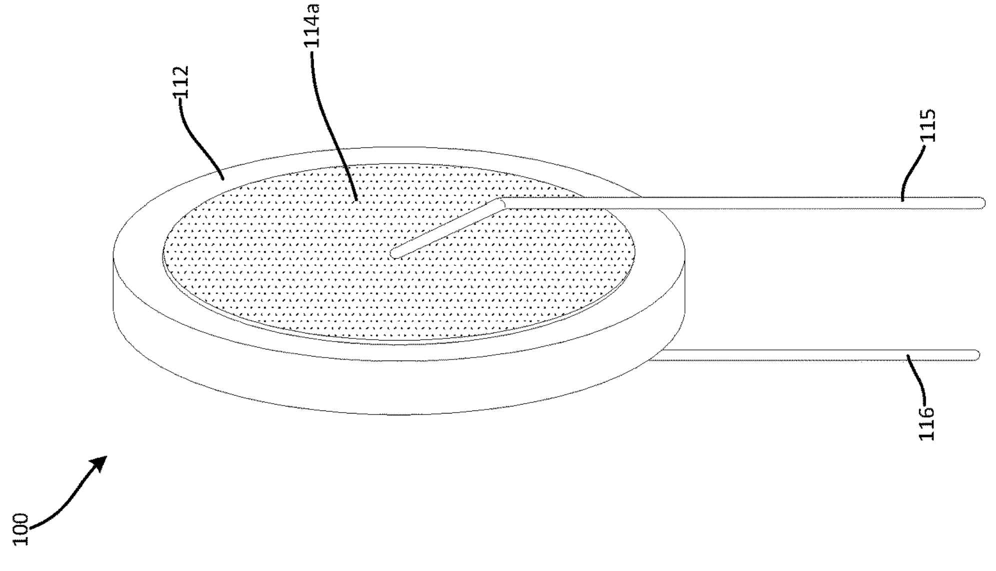
FIG. 2A is a front perspective view illustrating a TMOV device in accordance with an exemplary embodiment of the present disclosure.

Referring to FIGS. 2A and 2B, front and rear views of an exemplary embodiment of a thermally protected metal oxide varistor device 100 (hereinafter "the TMOV device 100") in accordance with the present disclosure are shown. The TMOV device 100 may include a MOV chip 112 having first and second electrically conductive electrodes 114*a*, 114*b* disposed on opposite sides thereof. The MOV chip 112 may be formed of any MOV composition known in the art, such as zinc oxide granules embedded in ceramic. The present disclosure is not limited in this regard.

The MOV chip 112 and the first and second electrodes 114*a*, 114*b* are depicted as being circular in shape, but this is not critical. It is contemplated that one or more of the MOV chip 112 and the first and second electrodes 114*a*, 114*b* may have a different shape, such as rectangular, triangular, irregular, etc. without departing from the scope of the present disclosure.

The TMOV device 100 may further include electrically conductive first and second leads 115, 116 for facilitating electrical connection of the TMOV device 100 within a circuit. The first lead 115 may be connected directly to the first electrode 114*a* on the front side of the MOV chip 112 via soldering, welding, electrically conductive adhesive, etc. The second lead 116 may be connected to a dielectric barrier 117 disposed on the rear side of the MOV chip 112 via soldering, adhesive, etc. The dielectric barrier 117 may be formed of ceramic or other dielectric material and may prevent direct electrical connection between the second lead 116 and the second electrode 114*b*. The TMOV device 100 may further include a thermal cutoff (TCO) element 119 having a first end electrically connected to the second lead 116 on the dielectric barrier 117 (e.g., via soldering) and a second end electrically connected to the second electrode 114*b* (e.g., via soldering). The TCO element 119 may be formed of an electrically conductive material and may be adapted to melt and separate upon reaching a predetermined temperature (e.g., 140 degrees Celsius-240 degrees Celsius). During normal operation, the TMOV device will operate in the manner of a normal MOV device. However, upon the occurrence of an overtemperature condition in the TMOV device 100, the TCO element 119 will melt, thereby arresting current flowing through the TMOV device 100 and preventing further heating that could ignite the TMOV device 100 and damage surrounding components.

Referring to FIG. 2C, the TMOV device 100 may further include a polymer coating 120 that covers the MOV chip 112, the first and second electrodes 114*a*, 114*b*, the dielectric barrier 117, the TCO element 119, and portions of the first and second leads 115, 116. The polymer coating 120 may protect the components of the TMOV device 100 from environmental elements and may prevent electrical shorting between the TMOV device 100 and surrounding circuit components.

As in the MOV device 10 described above, the first and second electrodes 114*a*, 114*b* of the TMOV device 100 may be formed of an electrically conductive material that is more thermally resistant (e.g., has a higher melting point) than metals such as aluminum, copper, or silver that are traditionally used to form the electrodes of TMOV devices. For example, the first and second electrodes 114*a*, 114*b* may be formed of various iron-based materials, including, but not limited to, galvanized steel, tin-coated steel, or composite materials such as cermet (a composite of metal and ceramic). In various non-limiting embodiments, the first and second electrodes 114*a*, 114*b* may be formed of a material having a melting point greater than 1100 degrees Celsius. In various embodiments, the first and second electrodes 114*a*, 114*b* may have a thickness in a range of 0.2 to 0.6 millimeters. The present disclosure is not limited in this regard.

Owing to the enhanced durability and thermal resistance of the electrodes 114*a*, 114*b* relative to conventional TMOV electrodes, the first and second electrodes 114*a*, 114*b* of the TMOV device 100 may be highly resistant to rupturing that could otherwise result from thermal runaway and/or electrical puncture in the MOV chip 112 upon overheating. The risk of the polymer coating 120 of the TMOV device 110 being ignited during an overheating event as thereby greatly mitigated relative to TMOV devices having conventional electrodes.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

While the present disclosure makes reference to certain embodiments, numerous modifications, alterations and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof.

The invention claimed is:

1. A metal oxide varistor (MOV) device comprising:

a MOV chip;

electrically conductive first and second electrodes disposed on opposite sides of the MOV chip; and electrically conductive first and second leads connected to the first and second electrodes, respectively;

wherein the first and second electrodes are formed of a material having a melting point greater than 1100 degrees Celsius, and wherein the first and second electrodes are planar and are disposed in a parallel relationship with one another.

2. The MOV device of claim 1, wherein the first and second electrodes are formed of a ferrous-based material.

3. The MOV device of claim 2, wherein the first and second electrodes are formed of galvanized steel.

4. The MOV device of claim 2, wherein the first and second electrodes are formed of tin-coated steel.

5. The MOV device of claim 2, wherein the first and second electrodes are formed of cermet.

6. The MOV device of claim 1, wherein the first and second electrodes have a thickness in a range of 0.2 to 0.6 millimeters.

7. The MOV device of claim 1, further comprising a dielectric polymer coating covering the MOV chip, the first and second electrodes, and portions of the first and second leads.

8. A thermally protected metal oxide varistor (TMOV) device comprising:

a MOV chip;

electrically conductive first and second electrodes disposed on opposite sides of the MOV chip;

an electrically conductive first lead connected to the first electrode;

an electrically conducive second lead connected to a dielectric barrier disposed on the second electrode; and a thermal cutoff (TCO) element having a first end electrically connected to the second lead on the dielectric barrier and a second end electrically connected to the second electrode;

wherein the first and second electrodes are formed of a material having a melting point greater than 1100 degrees Celsius, and wherein the first and second electrodes are planar and are disposed in a parallel relationship with one another.

9. The TMOV device of claim 8, wherein the dielectric barrier prevents direct electrical connection between the second lead and the second electrode.

10. The TMOV device of claim 8, wherein the first and second electrodes are formed of a ferrous-based material.

11. The TMOV device of claim 10, wherein the first and second electrodes are formed of galvanized steel.

12. The TMOV device of claim 10, wherein the first and second electrodes are formed of tin-coated steel.

13. The TMOV device of claim 10, wherein the first and second electrodes are formed of cermet.

14. The TMOV device of claim 8, wherein the first and second electrodes have a thickness in a range of 0.2 to 0.6 millimeters.

15. The TMOV device of claim 8, further comprising a dielectric polymer coating covering the MOV chip, the first and second electrodes, the dielectric barrier, the TCO element, and portions of the first and second leads.

* * * * *